US012531913B2

(12) United States Patent
Tonry et al.

(10) Patent No.: US 12,531,913 B2
(45) Date of Patent: Jan. 20, 2026

(54) MANAGING AN ENDPOINT DETECTION AND RESPONSE FRAMEWORK USING OUT OF BAND COMMUNICATION CHANNELS

(71) Applicant: Dell Products L.P., Round Rock, TX (US)

(72) Inventors: Richard M. Tonry, Georgetown, TX (US); Abeye Teshome, Austin, TX (US); Bassem El-Azzami, Austin, TX (US); Mohit Arora, Frisco, TX (US); Vinodkumar Vasudev Ottar, Mckinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/498,312

(22) Filed: Oct. 31, 2023

(65) Prior Publication Data
US 2025/0141929 A1    May 1, 2025

(51) Int. Cl.
*H04L 9/40*    (2022.01)
(52) U.S. Cl.
CPC .................... *H04L 63/20* (2013.01)
(58) Field of Classification Search
CPC ....................................................... H04L 63/20
See application file for complete search history.

(56) References Cited

U.S. PATENT DOCUMENTS

| | | | |
|---|---|---|---|
| 7,599,907 B2 | 10/2009 | Havewala et al. |
| 8,020,192 B2 | 9/2011 | Wright et al. |
| 8,490,163 B1 | 7/2013 | Harsell et al. |
| 8,738,935 B1 | 5/2014 | Brooker |
| 8,850,186 B2 | 9/2014 | Yamauchi |
| 9,165,931 B1 | 10/2015 | Schmit |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |

(Continued)

*Primary Examiner* — Khoi V Le
(74) *Attorney, Agent, or Firm* — WOMBLE BOND DICKINSON (US) LLP (57) ABSTRACT

Methods and systems for managing an endpoint detection and response (EDR) framework for data processing systems are disclosed. To monitor for malicious entities, a management controller of a data processing system may obtain a data package including data managed by hardware resources of the data processing system. The data package may be provided to a trusted management system via an out of band communication channel and the management controller may monitor for responses from the trusted management system. If the management controller identifies a response indicating that the data processing system is in a compromised state, one or more actions may be performed to remediate the compromised state of the data processing system.

20 Claims, 6 Drawing Sheets

(56) References Cited

U.S. PATENT DOCUMENTS

| | | |
|---|---|---|
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 2013/0227634 A1 | 8/2013 | Pal |
| 2015/0271207 A1* | 9/2015 | Jaiswal .................. H04L 63/20 726/1 |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2018/0255080 A1* | 9/2018 | Paine ................. H04L 63/1466 |
| 2018/0341773 A1 | 11/2018 | Khatri |
| 2019/0156019 A1 | 5/2019 | Chen |
| 2019/0207980 A1* | 7/2019 | Sarin ...................... G06F 21/85 |
| 2019/0312887 A1* | 10/2019 | Grimm ................ H04L 63/145 |
| 2020/0195433 A1 | 6/2020 | Collier |
| 2021/0099467 A1* | 4/2021 | March .................... G06N 20/00 |
| 2022/0222328 A1 | 7/2022 | Talib et al. |

* cited by examiner

FIG. 4

# MANAGING AN ENDPOINT DETECTION AND RESPONSE FRAMEWORK USING OUT OF BAND COMMUNICATION CHANNELS

FIELD

Embodiments disclosed herein relate generally to managing data processing systems. More particularly, embodiments disclosed herein relate to systems and methods to manage an endpoint detection and response framework for the data processing systems using at least an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services to any type and number of other devices and/or users of the data processing systems. The computer-implemented services may include any quantity and type of such services.

While providing, at least in part, the computer-implemented services, the data processing systems may be subject to attacks by malicious entities (e.g., malware may be introduced into the data processing systems). The malware and/or other malicious entities may compromise security of the data processing system and/or may disrupt the computer-implemented services provided by the data processing system.

In order to reduce a likelihood that malicious attacks may impact data processing systems throughout a distributed environment, an endpoint detection and response (EDR) framework may be implemented throughout the distributed environment. Data processing systems of the distributed environment and a trusted management system may participate in the EDR framework. The EDR framework may be implemented to monitor any number of data processing systems for potentially malicious activity.

To do so, an EDR process may involve monitoring data (e.g., event logs) managed by hardware resources of each data processing system of the data processing systems. If any suspicious activity is identified in the data for a data processing system, the data processing system may be treated as being in a compromised state. Data flagged as suspicious may be quarantined and/or other actions may be performed to remediate the compromised state of the data processing system.

However, data processing systems may rely on information provided by the trusted management system to identify the suspicious data. For example, the trusted management system may aggregate data related to known malicious entities and may provide the aggregated data to the data processing systems. Obtaining the aggregated data and performing the EDR process may be performed by software managed by the operating system of a data processing system and hosted by the hardware resources of the data processing system. Therefore, compromise of one or more in band components (e.g., of the hardware resources) may compromise integrity of the EDR process. In addition, use of in band computing resources (e.g., of a processor of the hardware resources) to execute the EDR process may consume an undesirable quantity of computing resources by the in band components during operation which may otherwise be usable for provision of computer-implemented services.

To participate in the EDR framework without reliance on in band components of the data processing system, embodiments disclosed herein relate to methods and systems for managing an EDR framework using a management controller of the data processing system and an out of band communication channel.

The management controller may obtain a data package using a portion of data managed by the hardware resources of the data processing system and may provide, via the out of band communication channel, the data package to the trusted management system. The trusted management system may then determine whether the data processing system is in a compromised state.

If the data processing system is in a compromised state (e.g., a malicious entity is identified), the trusted management system may provide instructions to the data processing system via the out of band communication channel, the instructions indicating one or more actions to remediate the compromised state of the data processing system.

By doing so, malicious entities (e.g., malware) present in data managed by the data processing system may be identified without relying on in band hardware resources and/or in band communication channels thereby increasing robustness of the EDR process. In addition, by assigning the EDR process to the management controller, computing resources available to the hardware components of the data processing system may be conserved for other purposes including provision of computer-implemented services.

In an embodiment, a method of managing data processing systems is provided. The method may include: obtaining, by a management controller of a data processing system of the data processing systems, a data package using a portion of data managed by hardware resources of the data processing system, the portion of the data being subject to an endpoint detection and response (EDR) framework; providing, by the management controller and via an out of band communication channel, the data package to a trusted management system that participates in the EDR framework; monitoring, by the management controller and via the out of band communication channel, for a response to the data package; making a determination, based on the monitoring and by the management controller, regarding whether the data processing system is in a compromised state; and in an instance of the determination in which the data processing system is in a compromised state: performing, by the data processing system, one or more actions to remediate the compromised state.

The data package may include the portion of the data or a signature for the portion of the data.

The EDR framework may be configured to identify whether the portion of the data corresponds to a malicious entity.

The malicious entity may be malware.

The EDR framework may also be configured to manage the malicious entity to reduce an impact of malicious activity by the malicious entity on the data processing system.

The data processing system may include a network module adapted to separately advertise network endpoints for the management controller and the hardware resources, the network endpoints being usable by the trusted management system to address communications to the hardware resources and the management controller.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The management controller may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1A:
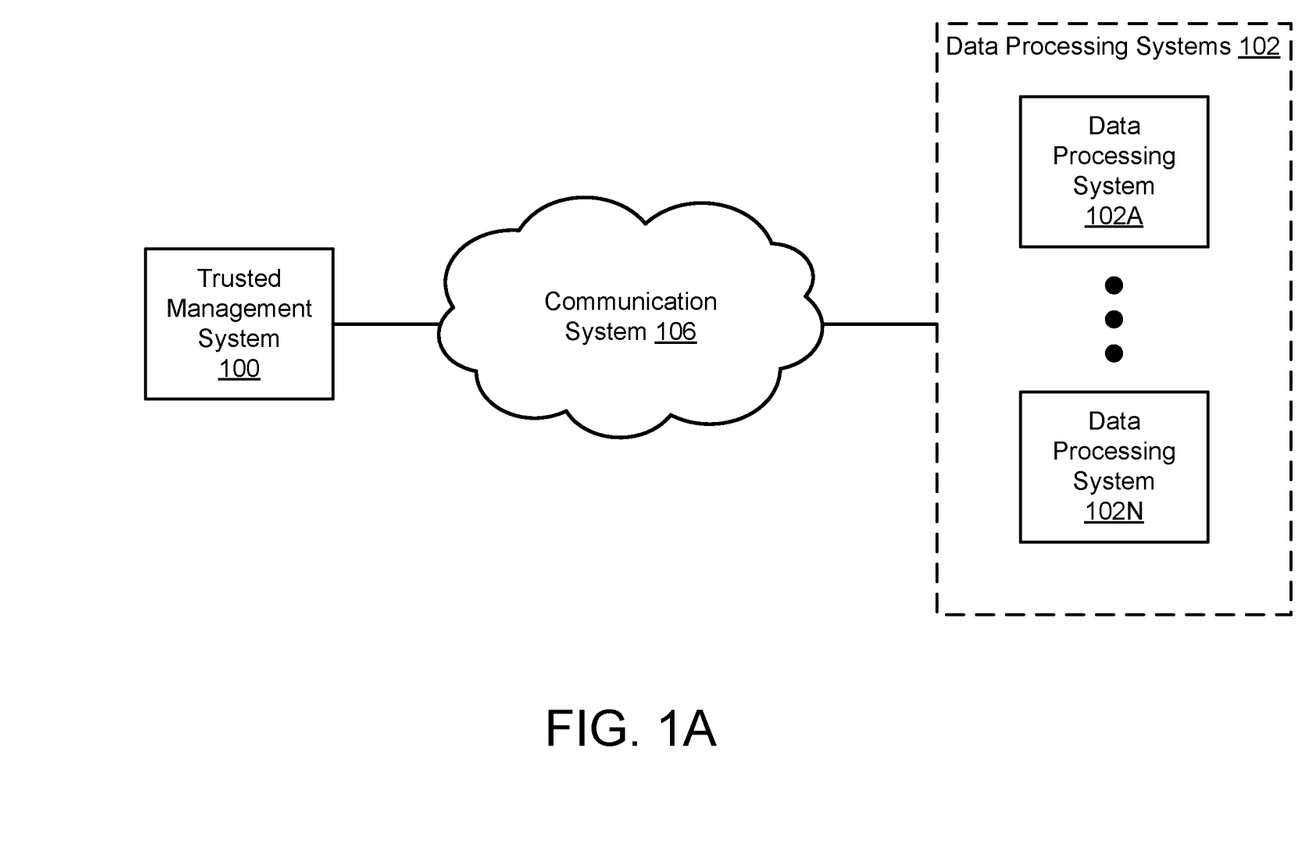
FIG. 1A shows a block diagram illustrating a system in accordance with an embodiment.
Figure 1B:
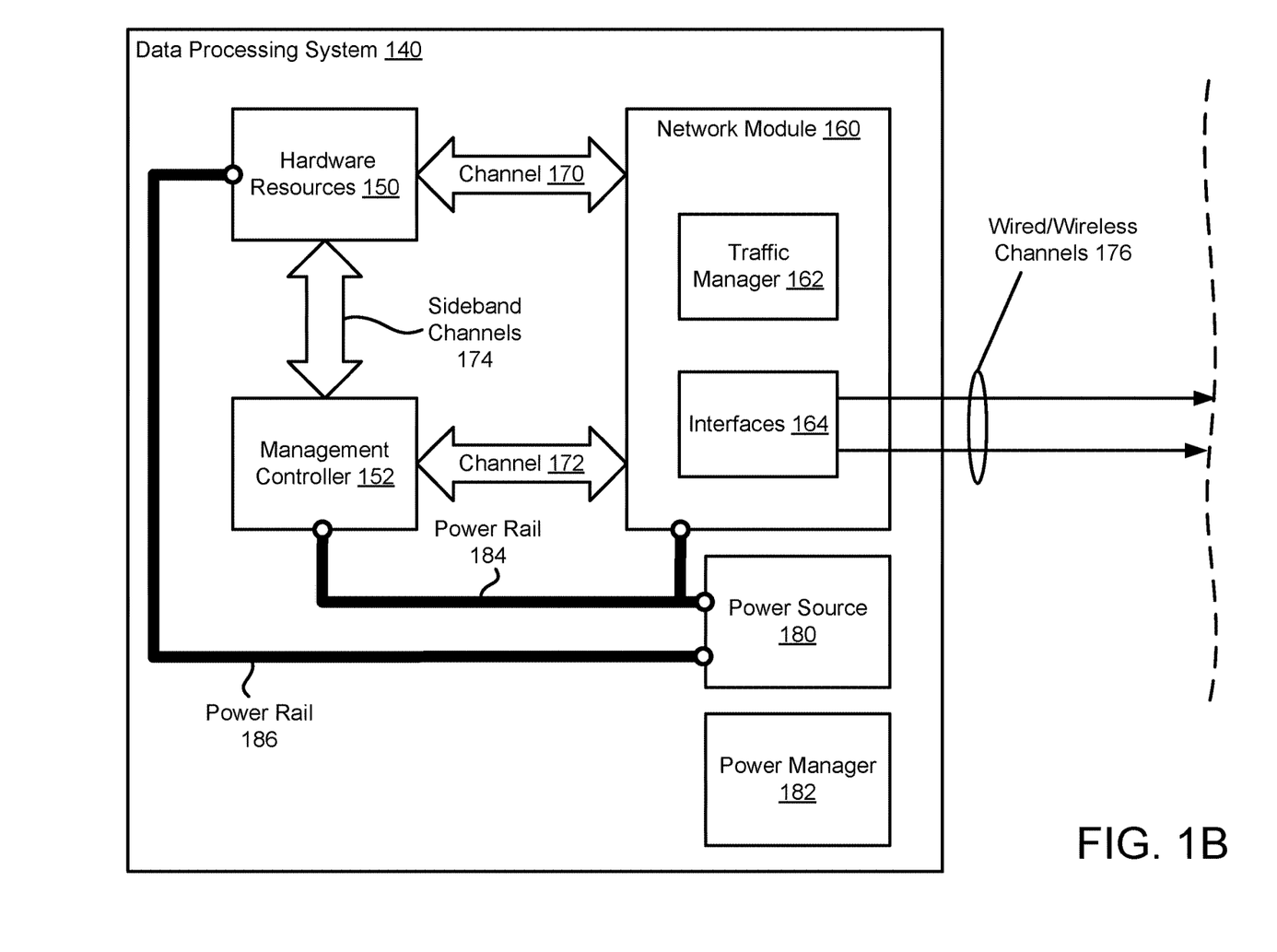
FIG. 1B shows a block diagram illustrating a data processing system in accordance with an embodiment.
Figure 1C:
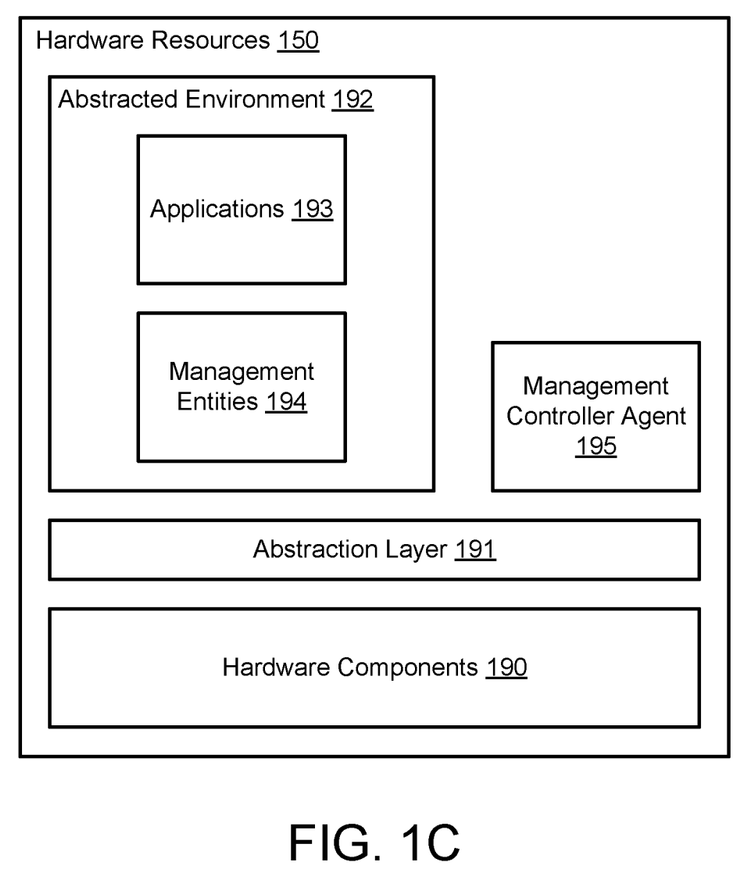
FIG. 1C shows a block diagram illustrating hardware resources of a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, trusted management system 100, data processing systems 102 and/or any other type of devices (not shown in FIG. 1A). Other types of computer-implemented services may be provided by the system shown in FIG. 1A without departing from embodiments disclosed herein.

While providing the aforementioned computer-implemented services, data processing systems 102 may encounter attacks by malicious entities (e.g., malware) attempting to infiltrate data processing systems 102. Malware, for example, may be introduced into software hosted by any of data processing systems 102 during a malicious attack attempting to steal data, modify operation of data processing systems 102, and/or manipulate the computer-implemented services provided by data processing systems 102.

To reduce impacts of malicious attacks on data processing systems 102, data processing systems 102 and trusted management system 100 may participate in an EDR framework. The EDR framework may be implemented, at least in part, by continuously scanning portions of data managed by hardware resources of data processing systems 102 to identify malicious entities.

To do so, a data processing system (e.g., 102A) of data processing systems 102 may obtain a portion of data managed by the hardware resources of data processing system 102A. The portion of the data may include: (i) a log of network connections and/or attempted network connections, (ii) hashed values of executable files, (iii) logs of events other than network connection attempts, and/or (iv) other data.

The portion of the data may be used as a data package. The data package may be compared to known threat intelligence feeds (e.g., command-and-control servers, malware signatures). Data processing system 102A may be treated as being in a compromised state if the data package includes any data that matches a portion of the threat intelligence feeds.

However, implementation of the EDR framework may rely on in band components of data processing system 102A

(e.g., hardware resources, software components hosted by the hardware components, in band network endpoints). Compromise of one or more in band components may render other in band components (e.g., the operating system of data processing system 102A) vulnerable to compromise as well. As the EDR process may be initiated by the operating system of data processing system 102A, compromise of any in band components may reduce reliability of EDR processes for threat detection.

In addition, continuous performance of the EDR process may consume an undesirable quantity of computing resources (e.g., processors, memory modules, storage) available to the in band components, which may leave fewer computing resources available to assist in provision of the computer-implemented services.

In general, embodiments disclosed herein relate to systems, devices, and methods for managing an EDR framework for data processing systems 102. To do so, a management controller of a data processing system (e.g., 102A) may gather data managed by hardware resources of data processing system 102A.

At least a portion of the data managed by the hardware resources may be included in a data package and the management controller may provide the data package, via an out of band communication channel, to trusted management system 100. Trusted management system 100 may utilize the data package to determine whether data processing system 102A is in a compromised state (e.g., via comparison to threat intelligence feeds).

If data processing system 102A is suspected as being in a compromised state (e.g., via detection of one or more potentially malicious entities using the data package), trusted management system 100 may provide one or more actions to data processing system 102A via the out of band communication channel. The one or more actions may be intended to remediate the compromised state of data processing system 102A.

The management controller and a network module responsible for directing network traffic to the out of band communication channel may be powered separately from hardware resources of data processing system 102A and, therefore, the management controller may perform actions and send and/or receive communications while the hardware resources of data processing system 102A are unpowered. In addition, by utilizing the out of band communication channel, communications related to the EDR process may not traverse any in band components of data processing system 102A.

By doing so, potential compromise of in band components may not impact the EDR process. In addition, computing resources available to the in band components may be conserved for performance of other tasks (e.g., provision of computer-implemented services).

Trusted management system 100 may be implemented using a physical device that aggregates and manages threat intelligence feeds (e.g., identifiers for command-and-control servers, known malware signatures). Data processing systems 102 may interact with trusted management system 100 to provide data packages related to operation of hardware resources and/or software components hosted by the hardware resources. Trusted management system 100 may obtain the data package and may analyze the data package (e.g., via comparison to the threat intelligence feeds) to determine whether data processing system 102A is in a potentially compromised state. If data processing system 102A is in a compromised state, trusted management system 100 may identify one or more actions to be performed to remediate the compromised state and may provide the one or more actions to data processing system 102A via an out of band communication channel of communication system 106.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and trusted management system 100).

Communication system 106 may include out of band communication channels, in band communication channels, and/or other types of communication channels.

Refer to FIGS. 1B-1C for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of the data processing systems 102 shown in FIG. 1A.

To provide computer-implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities. Refer to FIG. 1C for additional details regarding software entities that may be hosted by hardware resources 150.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

To provide its functionality, management controller 152 may: (i) obtain a data package using a portion of data managed by hardware resources 150 of data processing system 140, the portion of the data being subject to an EDR framework, (ii) provide, via an out of band communication channel (e.g., 172) the data package to a trusted management system (not shown) that participates in the EDR framework, (iii) monitoring, via the out of band communication channel, for a response to the data package, and/or (iv) determining, based on the monitoring, whether data processing system 140 is in a compromised state. If data processing system 140 is determined to be in a compromised state, management controller 152 (and/or another entity such as an agent) may perform one or more actions to remediate the compromised state.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2:
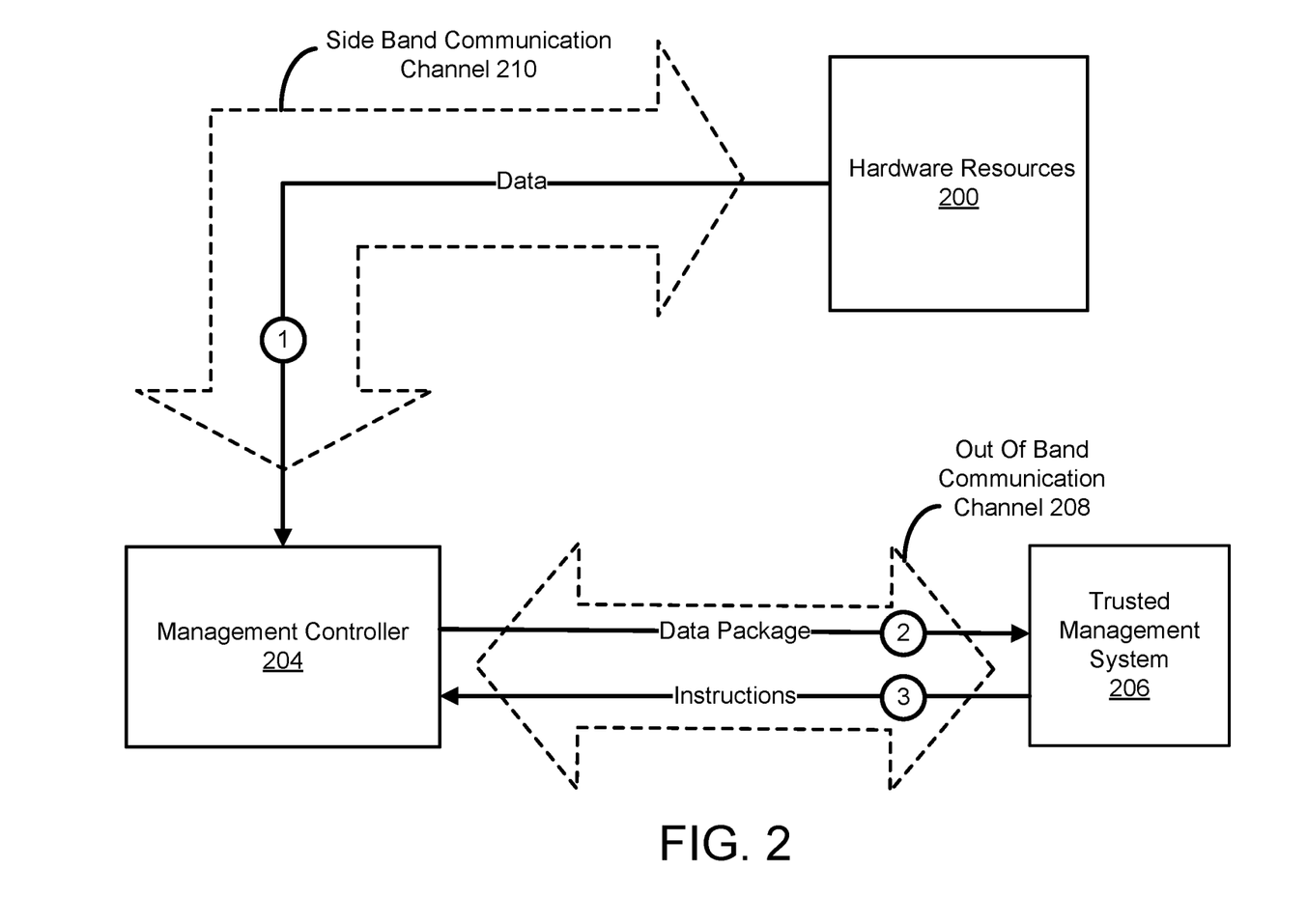
FIG. 2 shows a data flow diagram illustrating a management controller interacting with a trusted management system and hardware resources in accordance with an embodiment.
Figure 3:
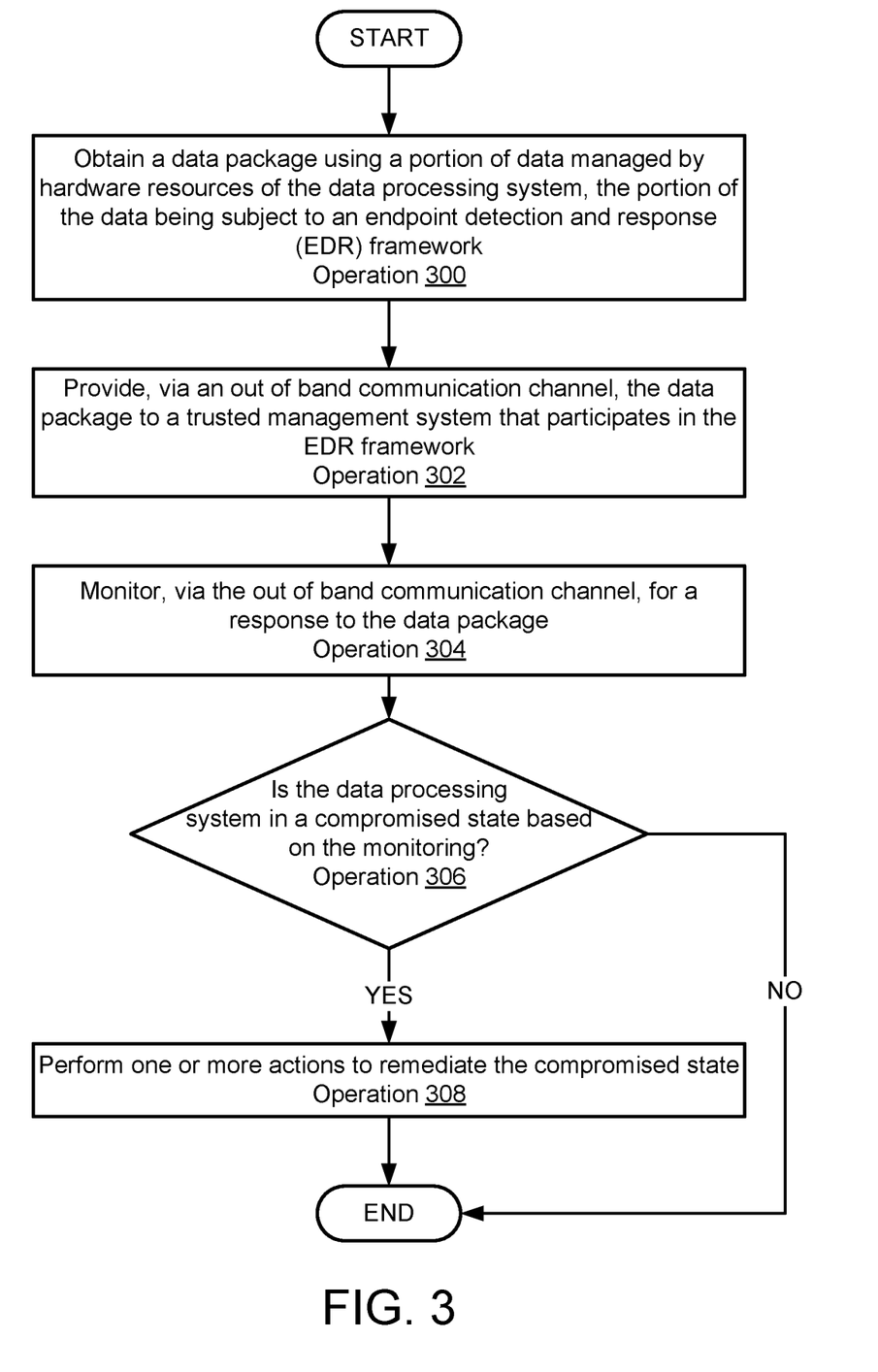
FIG. 3 shows a flow diagram illustrating a method of managing an endpoint detection and response framework for a data processing system in accordance with an embodiment.

When providing its functionality, management controller 152 may perform all, or a portion, of the methods and operations illustrated in FIGS. 2-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware components 190. Hardware components 190 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

Specifically, management controller agent 195 may be responsible for generating a data package and providing the data package to management controller 152. In addition, management controller agent 195 may assist in performance of one or more actions to remediate any detected malicious entity based on the data package. Specifically, management controller agent 195 may participate in quarantine of at least a portion of the data included in the data package.

While illustrated in FIG. 1C with a limited number of specific components, a system may include additional, fewer, and/or different components without departing from embodiments disclosed herein.

As discussed above, the components of FIGS. 1A-1C may perform various methods to manage an EDR framework for data processing systems that perform computer-implemented services. FIGS. 2-3 may illustrate examples of methods that may be performed by the components of FIGS. 1A-1C. For example, a management controller similar to management controller 152 may perform all or a portion of the methods. In the diagrams discussed below and shown in FIGS. 2-3, any of the operations may be repeated, performed in different orders, and/or performed in parallel with or in a partially overlapping in time manner with other operations.

FIG. 2 shows a data flow diagram illustrating a management controller interacting with a trusted management system and hardware resources in accordance with an embodiment. The data flow diagram may illustrate participation of a data processing system in an EDR framework usable to identify malicious entities acting on hardware resources of a data processing system similar to data processing system 140 described in FIGS. 1B-1C.

In FIG. 2, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

Consider a scenario in which an EDR framework is implemented to detect malicious activity by malicious entities (e.g., malware) attempting to compromise a data processing system. For example, the malicious entity may include: (i) a computer virus, (ii) ransomware, (iii) spyware, (iv) adware, (v) Trojan horse, and/or (vi) any other type of malware.

The EDR framework may be implemented, at least in part, by hardware resources 200 of the data processing system, management controller 204 of the data processing system, and/or trusted management system 206. Management controller 204 may be similar to management controller 152 described in FIG. 1B and hardware resources 200 may be similar to hardware resources 150 described in FIG. 1C. Trusted management system 206 may be similar to trusted management system 100 described in FIG. 1A.

To implement the EDR framework, at time point one (1), management controller 204 may obtain data from hardware resources 200 via side band communication channel 210. Side band communication channel 210 may be similar to any of sideband channels 174 described in FIG. 1B. The data may include any data managed by hardware resources 200 that is subject to the EDR framework. For example, the data may include: (i) portions of instructions executable by software components hosted by hardware resources 200, (ii) network connection attempts, (iii) processes previously executed by software components, (iii) registry modifications, (v) logs of currently running processes (vi) cross process events, and/or (viii) other data.

Upon receipt of the data, management controller 204 may generate a data package (not shown) using at least a portion of the data. The data package may include the at least the portion of the data or may include a signature for the portion of the data. For example, the data package may include hashed values of executable files and/or other signatures.

In addition, hardware resources 200 may generate the data package (e.g., via management controller agent 195 described in FIG. 1C and/or another management entity) and may provide the data package to management controller 204 via side band communication channel 210.

Management controller 204 may store a copy of the data package locally and/or may provide the data package to trusted management system 206 via out of band communication channel 208 as shown at time point two (2). Out of band communication channel 208 may be similar to channel 172 described in FIG. 1B.

As described in FIG. 1B, management controller 204 and a network module that manages communications sent and received via out of band communication channel 208 may be powered by a separate power domain than hardware resources 200. Therefore, if hardware resources 200 are unpowered, management controller 204 may be powered. Refer to FIG. 1B for additional details regarding power domains.

As part of the EDR process, trusted management system 206 may determine whether the portion of the data included in the data package corresponds to a malicious entity (e.g., malware). Trusted management system 206 may maintain and/or access one or more threat intelligence feeds. The trusted intelligence feeds may include continuously updated information related to known and/or potential security threats for data processing systems (e.g., malware signatures).

Following time point two (2), management controller 204 may monitor out of band communication channel 208 for a response from trusted management system 206.

In a first example, trusted management system 206 may determine that the data processing system is not in a compromised state (e.g., via failing to identify a malicious entity in the data package). Therefore, management controller 204 may receive no response to the data package. In this first example, management controller 204 may also receive a notification from trusted management system 206 and via out of band communication channel 208, the notification indicating that the data processing system is not in a compromised state (not shown).

In a second example, trusted management system 206 may determine that the data processing system is in a compromised state (e.g., via identification of a malicious entity in the data package). Therefore, management controller 204 may receive instructions from trusted management system 206 via out of band communication channel 208 in response to the data package as shown at time point three (3).

Along with identifying malicious entities, the EDR framework may also be usable to manage malicious entities to reduce an impact of malicious activity by the malicious entity on the data processing system. To do so, the instructions may include one or more actions to be performed to remediate the malicious entity.

For example, the malicious entity may be malware included in a portion of the data provided by the data package. The one or more actions may indicate that the portion of the data is to be quarantined. The one or more actions may also include: (i) providing the portion of the data to another entity for further analysis, (ii) deleting the portion of the data, (iii) rolling back one or more software applications to previous versions that are not impacted by the portion of the data, and/or (iv) other actions.

Management controller 204 and/or another entity may perform the one or more actions to remediate the compromised state of the data processing system (not shown). By doing so, an EDR framework may be implemented without any data subject to the EDR framework traversing in band components of the data processing system. By doing so, malicious activity may be detected while conserving computing resources of hardware resources 200 and while avoiding compromise by any malicious attackers attempting to compromise the EDR framework.

In an embodiment, the one or more entities performing the operations shown in FIG. 2 are implemented using a processor adapted to execute computing code stored on a persistent storage that when executed by the processor performs the functionality of the system of FIGS. 1A-1C discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1A may perform various methods to manage data processing systems. FIG. 3 illustrates methods that may be performed by the components of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing an EDR framework for a data processing system in accordance with an embodiment is shown. The method may be performed, for example, by a management controller, and/or any other entity.

At operation 300, a data package may be obtained using a portion of data managed by hardware resources of the data processing system, the portion of the data being subject to an EDR framework. Obtaining the data package may include: (i) receiving, via a side band communication channel, the data package in the form of a message from a software agent hosted by the hardware resources, (ii) reading the data package from storage (e.g., a shared storage architecture that the software agent has access to), (iii) generating the data package, and/or (iv) other methods.

Generating the data package may include: (i) obtaining a portion of data managed by the hardware resources, (ii) encapsulating the portion of the data into a data structure and/or (iii) treating the data structure as the data package.

At operation 302, the data package may be provided, via an out of band communication channel, to a trusted management system that participates in the EDR framework. Providing the data package may include: (i) generating a message including the data package, (ii) providing the message to a network stack and/or driver to be subsequently transmitted in a packaged form to the trusted management system via the out of band communication channel, and/or (iii) other methods.

Providing the data package may also include transmitting the data package to a trusted entity that is not the trusted management system, the trusted entity being responsible for providing the data package to the trusted management system.

At operation 304, a response to the data package may be monitored for via the out of band communication channel. Monitoring the out of band communication channel for a response may include: (i) reading logs from storage, the logs indicating incidents of connection requests and/or data transmissions from the trusted management system via the out of band communication channel, (ii) querying a network module of the data processing system to listen for connection requests and/or data transmissions from the trusted management system, (iii) obtaining a report from an entity, the entity being responsible for generating logs of network connection activity for the data processing system, and/or (iv) other methods.

At operation 306, it may be determined whether the data processing system is in a compromised state based on the monitoring. Determining whether the data processing system is in a compromised state may include: (i) identifying that a response was received from the trusted management system, (ii) reading the response, (iii) interpreting the response to identify one or more actions to be performed to remediate the compromised state of the data processing system, and/or (iv) other methods.

If the data processing system is determined to be in a compromised state, the method may proceed to operation 308. If the data processing system is not determined to be in a compromised state, the method may end following operation 306.

At operation 308, one or more actions may be performed to remediate the compromised state. Performing the one or more actions may include: (i) quarantining the portion of the data included in the data package, (ii) packaging and transmitting the data package to another entity responsible for further analysis of the data package, (iii) deleting the portion of the data, (iv) reverting one or more software applications hosted by the hardware resources to a previous version, the previous version not being impacted by the portion of the data, and/or (iv) other methods.

The method may end following operation 308.

Figure 4:
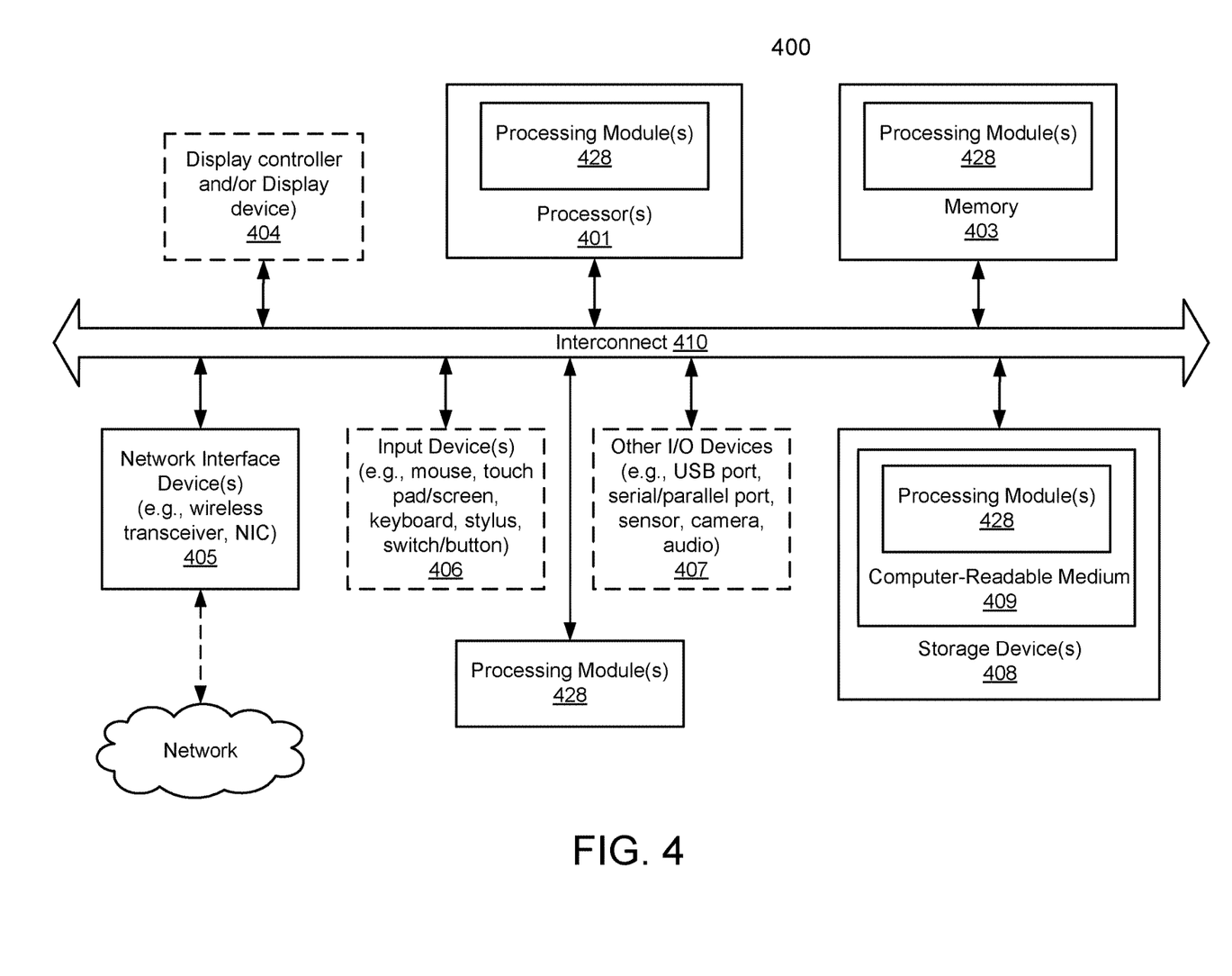
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
   obtaining, by a management controller of a data processing system of the data processing systems, a data package using a portion of data managed by hardware resources of the data processing system, the portion of the data being subject to an endpoint detection and response (EDR) framework, the management controller being a separate and independently operating computing device that is physically installed within the data processing system;
   providing, by the management controller and via an out of band communication channel, the data package to a trusted management system that participates in the EDR framework;
   monitoring, by the management controller and via the out of band communication channel, for a response to the data package;
   making a determination, based on the monitoring and by the management controller, regarding whether the data processing system is in a compromised state; and
   in an instance of the determination in which the data processing system is in a compromised state:
   performing, by the data processing system, one or more actions to remediate the compromised state.

2. The method of claim 1, wherein the data package comprises the portion of the data or a signature for the portion of the data.

3. The method of claim 1, wherein the EDR framework is configured to identify whether the portion of the data corresponds to a malicious entity.

4. The method of claim 3, wherein the malicious entity is malware.

5. The method of claim 3, wherein the EDR framework is further configured to manage the malicious entity to reduce an impact of malicious activity by the malicious entity on the data processing system.

6. The method of claim 1, wherein the data processing system comprises a single network module that is shared by both of the management controller and the hardware resources, the single network module being adapted to separately advertise network endpoints for the management controller and the hardware resources, the network endpoints being usable by the trusted management system to address communications to the hardware resources and the management controller as two separate and independent network entities that are connected to the trusted management system.

7. The method of claim 6, wherein the management controller and the single network module are on separate power domains from the hardware resources so that the management controller and the single network module are operable while the hardware resources are inoperable.

8. The method of claim 6, wherein the out of band communication channel runs through the single network module, and an in band communication channel that services the hardware resources also runs through the single network module.

9. The method of claim 6, wherein the management controller hosts a transmission control protocol/internet protocol (TCP/IP) stack to facilitate network communications via the out of band communication channel.

10. The method of claim 1, wherein the hardware resources comprise a first processor of the data processing system, and the management controller comprises a second processor that operates independently from the first processor.

11. A non-transitory machine-readable medium having instructions stored therein, which when executed by a processor, cause the processor to perform operations for managing data processing systems, the operations comprising:
    obtaining, by a management controller of a data processing system of the data processing systems, a data package using a portion of data managed by hardware resources of the data processing system, the portion of the data being subject to an endpoint detection and response (EDR) framework, the management controller being a separate and independently operating computing device that is physically installed within the data processing system;

providing, by the management controller and via an out of band communication channel, the data package to a trusted management system that participates in the EDR framework;

monitoring, by the management controller and via the out of band communication channel, for a response to the data package;

making a determination, based on the monitoring and by the management controller, regarding whether the data processing system is in a compromised state; and in an instance of the determination in which the data processing system is in a compromised state:
performing, by the data processing system, one or more actions to remediate the compromised state.

12. The non-transitory machine-readable medium of claim 11, wherein the data package comprises the portion of the data or a signature for the portion of the data.

13. The non-transitory machine-readable medium of claim 11, wherein the EDR framework is configured to identify whether the portion of the data corresponds to a malicious entity.

14. The non-transitory machine-readable medium of claim 13, wherein the malicious entity is malware.

15. The non-transitory machine-readable medium of claim 13, wherein the EDR framework is further configured to manage the malicious entity to reduce an impact of malicious activity by the malicious entity on the data processing system.

16. The method of claim 6, wherein the single network module separately advertises network endpoints for the management controller and the hardware resources such that first communications of the communications that are meant for the hardware resources never flow through the management controller and second communications of the communications that are meant for the management controller never flow through the hardware resources.

17. A data processing system, comprising:
a processor; and
a memory coupled to the processor to store instructions, which when executed by the processor, cause the processor to perform operations for managing data processing systems, the operations comprising:
obtaining, by a management controller of a data processing system of the data processing systems, a data package using a portion of data managed by hardware resources of the data processing system, the portion of the data being subject to an endpoint detection and response (EDR) framework, the management controller being a separate and independently operating computing device that is physically installed within the data processing system;

providing, by the management controller and via an out of band communication channel, the data package to a trusted management system that participates in the EDR framework;

monitoring, by the management controller and via the out of band communication channel, for a response to the data package;

making a determination, based on the monitoring and by the management controller, regarding whether the data processing system is in a compromised state; and in an instance of the determination in which the data processing system is in a compromised state:
performing, by the data processing system, one or more actions to remediate the compromised state.

18. The data processing system of claim 17, wherein the data package comprises the portion of the data or a signature for the portion of the data.

19. The data processing system of claim 17, wherein the EDR framework is configured to identify whether the portion of the data corresponds to a malicious entity.

20. The data processing system of claim 19, wherein the malicious entity is malware.

* * * * *